Dec. 20, 1927.
W. A. FRISBIE
CANDY BOX
Filed June 4, 1925
1,653,456
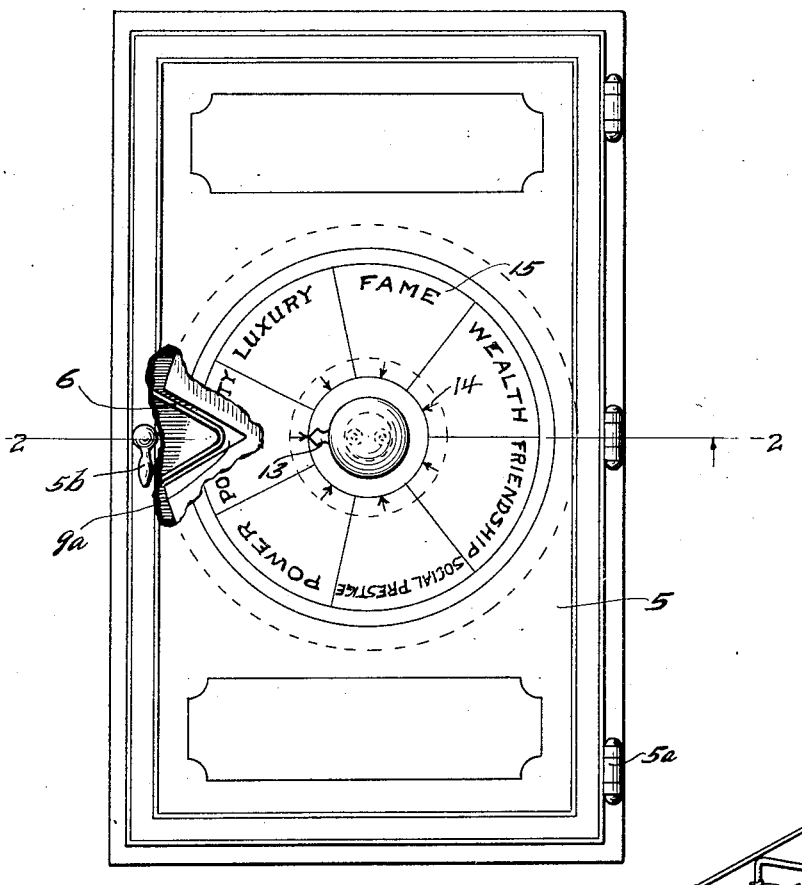
Fig. 1.
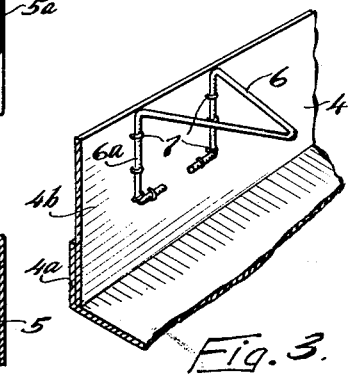
Fig. 3.
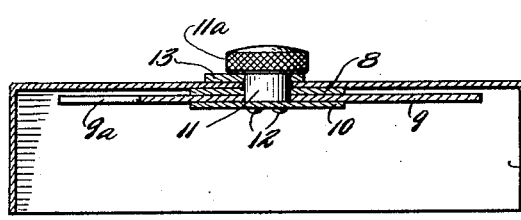
Fig. 2.
INVENTOR
WILLIAM A. FRISBIE
BY HIS ATTORNEYS
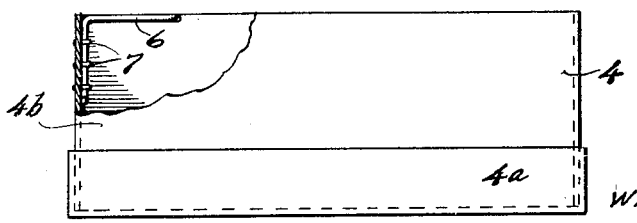

Patented Dec. 20, 1927.

1,653,456

UNITED STATES PATENT OFFICE.

WILLIAM A. FRISBIE, OF MINNEAPOLIS, MINNESOTA.

CANDY BOX.

Application filed June 4, 1925. Serial No. 34,881.

This invention relates to a container for candy or other commodities, and particularly to such a container commonly known as a novelty type. Candy containers having special or novel features therein are at present in demand among candy manufacturers.

It is an object of this invention, therefore, to provide a simple and inexpensive container for candy or similar material having a novel and interesting closing and opening means.

It is a further object of the invention to provide a candy container comprising a body having its opposite sides substantially parallel over which sides a lid is fitted, the lid and box being equipped with locking means adapted to be opened from the outside of the box.

It is a further object of the invention to provide a container, as set forth in the preceding paragraph in which the top of the lid has on its exterior circumferentially arranged designations and the locking means has an operating member with a pointer adapted to aline with one of said designations when the locking means is in position for the box to be opened.

These and other objects and advantages of the invention will be fully set forth in the following description made in connection with the accompanying drawings in which like reference characters refer to the same parts throughout the different views, and in which, Fig. 1 is a plan view of the device, a portion thereof being broken away to show the interior;

Fig. 2 is a view partly in elevation and partly in vertical section on the line 2—2 of Fig. 1; and Fig. 3 is a perspective view of a portion of the inside of the box body.

Referring to the drawings, the container is shown comprising a body portion 4 and a top or lid portion 5. While the body portion 4 may be variously made and of various shapes, in the embodiment of the invention illustrated, the same is shown as in the form of a rectangular box open at its top and having opposite parallel sides, the same having a bottom portion 4ª into which the upwardly projecting side portions 4ᵇ are fitted and secured. The lid 5 is likewise of rectangular shape with opposite parallel sides which are adapted to fit down closely over the sides 4ᵇ against the ledge formed by the top of the lower portion 4ª.

A locking or latch member is provided on the body portion and while this latch member may be made of various forms, in the embodiment of the invention illustrated, the same is shown as the member 6 having a pointed or triangular portion projecting inwardly from the side wall of the body substantially in the plane of its top edge. The member 6 is shown as made of a small rod or wire having vertical legs 6ª which are bent toward each other substantially at right angles at their terminal ends, which legs are secured to the side of the body by a plurality of small staples 7. The member 6, preferably is made of resilient material and has a tendency to spring upward so that it will be maintained substantially in the plane of the top edge of the body. The lid 5 has an opening therethrough in its center of circular shape and a washer 8 is secured, as by gluing or otherwise, to the under surface of the top of said lid. A locking member which is illustrated as a disk 9, is disposed beneath the washer 8 and has secured thereto, as by gluing, or otherwise, a lower washer 10, the washer 10 being secured to a stem 11 projecting upward through the top of the lid and having a top operating handle 11ª shown as in the form of a disk with knurled edges. The washer 10 may be secured to stem 11 in any suitable manner, as by the tacks 12 shown. The disk 9 has an opening 9ª cut therein, shown as of triangular or sector shape, which opening is adapted to embrace and be able to pass over the latch member 6. The operating disk 11ª has secured at its underside a pointer member 13 which is adapted to aline with any one of a plurality of markers 14 which are disposed centrally of circumferentially arranged spaces of sector shape, each of which is provided with a designation 15, these designations in the embodiment of the invention illustrated, taking the form of the words "Fame", "Wealth", "Friendship", "Social prestige", "Power", "Popularity" and "Luxury". The top of the lid 5, except for the members 11ª and 13, is flat and the same preferably is printed or ornamented to represent a safe having hinges 5ª and a latch 5ᵇ. The box will also carry some verse or appropriate inscription in one of the enclosed spaces shown thereon.

In operation, the body 4 will be filled, as usual, with the candy or other material. The particular designation at which the box is to open will then be determined and the pointer 13 will be turned into alinement with the point for this designation. At this time, the opening 9ª will aline with the latch 6 and the lid 5 can then be placed on the box, as usual, and the box wrapped and closed, as usual. The member 11ª will then be turned to bring the solid part of the disk 9 under the latch member 6. Owing to the fact that the lid 5 has its parallel sides fitting closely over the parallel sides of the body 4, it cannot be lifted or removed until the opening 9ª is again brought into alinement with latch 6. The customer will not know at which designation the box will open unless it is indicated in the verse. When the opening 9ª is again alined with latch 6 the lid, of course, can be lifted. The member 6, as stated, tends to spring upward so that the disk 9 can always pass thereunder.

From the above description it is seen that applicant has provided a simple and ingenious candy container having a locking and opening means which will afford amusement and entertainment. The device is easily and inexpensively made and easily understood by the customer. The device has been amply demonstrated in actual practice and been found to be very successful and efficient.

It will, of course, be understood, that various changes may be made in the form, details, arrangement and proportions of the parts without departing from the scope of applicant's invention, which, generally stated, consists in a device capable of carrying out the objects above set forth, in the novel parts and combinations of parts disclosed and defined in the appended claims.

What is claimed is:

1. A candy box or container for confections, comprising a body having a wall with substantially parallel sides, a lid fitting said body having a wall with parallel sides fitting over said sides, a latch means carried by said body comprising a disk at the underside of said lid adapted to pass under said latch but having an opening adapted to pass said latch, a washer secured to the underside of said disk a stem to which said disk is connected projecting through said lid, a knob on said stem, a spacing washer between said disk and lid, a plurality of circumferentially spaced designations on top of said lid indicating desirable human states, and a pointer on said stem adapted to aline with one of said designations when said opening in said disk alines with said latch.

2. A candy box or container for confections, comprising a body having a substantially vertical wall, a lid fitting over said body having sides closely fitting over said wall, a locking member carried by said body having a portion disposed in a horizontal plane substantially at the top of said body and adapted to lie closely beneath said lid, a disk carried by and spaced from the under side of said lid having an opening therein adapted to pass over said portion so that said disk may be turned and brought under said portion to lock said lid, a handle on top of said lid having a pointer thereon and connected to said disk to rotate the same, and circumferentially spaced designations on top of said lid indicating human states or attributes, one of which is adapted to indicate when said space is alined with said portion.

In testimony whereof I affix my signature.

WILLIAM A. FRISBIE.